May 12, 1970 J. A. HIBNER 3,512,171

DRIVE CIRCUITRY FOR HIGH FREQENCY DIGITAL RECORDING

Filed Aug. 17, 1967 2 Sheets-Sheet 1

INVENTOR.
JOHN A. HIBNER
BY
Christie, Parker & Hale
ATTORNEYS.

May 12, 1970 J. A. HIBNER 3,512,171

DRIVE CIRCUITRY FOR HIGH FREQENCY DIGITAL RECORDING

Filed Aug. 17, 1967 2 Sheets-Sheet 2

United States Patent Office 3,512,171
Patented May 12, 1970

3,512,171

DRIVE CIRCUITRY FOR HIGH FREQUENCY DIGITAL RECORDING

John A. Hibner, Sierra Madre, Calif., assignor to Burroughs Corporation, Detroit, Mich., a corporation of Michigan Filed Aug. 17, 1967, Ser. No. 661,364
Int. Cl. G01d 15/06
U.S. Cl. 346—74 18 Claims

ABSTRACT OF THE DISCLOSURE

A drive circuit having two symmetrical circuits for respectively presenting write currents of opposite polarity and having a fast transient rise time to a recording head. Each symmetrical circuit presents a source of constant voltage to the head during the transient period and a source of constant current to the head during a succeeding steady-state period. A switching element common to both symmetrical circuits effects the transition after a predetermined period of time.

BACKGROUND OF THE INVENTION

This invention relates to the magnetic recording of digital information and more particularly to drive circuitry for providing a write current having an extremely rapid transient rise time and a constant steady-state value for driving a recording head operating at a high bit-rate.

In the magnetic recording of digital information, it has been found that the write current rise time in the recording head ordinarily need not be shorter than one-half of a digit cell time. However, as bit-rates increase, and digit cell times correspondingly decreases, the rise time of write current signals presented to the recording head may place an upper limit on the bit-rates which may be achieved. This results since the use of higher bit-rates requires that the write current signals reach their peak current value in a faster time in order to achieve full flux reversal in the magnetic recording medium within the shorter cell times.

The rise time of write current signals presented to the recording head is governed by several factors. One major factor is the inductance presented by the recording head itself. Another is the distributed capacitance presented by the length of connecting cable between the recording head and the drive circuitry. A relatively long length of connecting cable is generally unavoidable since the recording head is ordinarily isolated from the drive circuitry by as much as six to twenty feet. Additionally, where the same head is used in both the read and write modes of operation, it must be shielded from extraneous noise during the read mode and, because of this shielding, there will be additional distributed capacitance during the write mode.

Empirical tests may be used to determine the steady-state value of write current which must flow in a particular recording head in order to saturate the recording medium associated with the head. It is convenient to supply this current to the recording head by means of a source of constant current since such a source can tolerate an initial high inductive reactance presented by the recording head followed by a low impedance as steady-state conditions are approached. Additionally such a source is current limiting and power limiting during steady-state operation, thereby saving in the expenditure of power and protecting components from burning out. A source of constant current cannot satisfactorily be used, however, where high bit-rates are desired, since the distributed capacitance presented by the connecting cable severely limits the rise time of the current presented to the recording head.

Knowing the values of inductance and resistance presented by a particular recording head, it is possible to determine the value of constant voltage needed to produce the desired value of write current in the recording head within one-half of a predetermined digit cell time. Although such use of a source of constant voltage is advantageous during the transient period in which the write current reaches a desired value, it cannot be satisfactorily used during the succeeding steady-state period without producing unduly large currents, dissipating large amounts of power and possibly burning out circuit components.

One prior art approach to the aforesaid problem has been to utilize a voltage source and current limiting resistor in series with the recording head in order to furnish a steady-state current of desired magnitude. An initial high voltage is applied to the head as a result of a capacitor shunted across the current limiting resistor. This approach, however, is not satisfactory for extremely fast bit-rates and dissipates large amounts of power in the current limiting resistor during steady-state operation.

Another prior art approach is disclosed in the copending patent application of D. A. Wisner, Ser. No. 499,705, filed on Oct. 21, 1965, now U.S. Pat. No. 3,438,054, and assigned to the asignee of the present invention. The approach described in the Wisner application utilizes a pair of symmetrical circuits each having a transient, substantially resistance free circuit and a resistive steady-state circuit, operating in sequence. Each of the symmetrical circuits utilizes a source of constant voltage.

An advantage of the present invention is that it provides a drive circuit capable of operating at bit-rates of at least ten megacycles.

Another advantage of the present invention is that it utilizes a source of constant voltage during the transient period in which the write current rises to its steady-state value.

Another advantage of the present invention is that it utilizes a source of constant current during the steady-state period after the write current has reached its steady-state value.

Yet another advantage of the present invention is that it provides a drive circuit which utilizes a pair of symmetrical circuits, respectively responsive to complementary signals representing binary values, and in which the symmetrical circuits mutually share some circuit components.

SUMMARY OF THE INVENTION

In brief, the preceding and additional advantages are achieved in a drive circuit in which a write current of either of two polarities is provided to a recording head by a respective one of two symmetrical circuits. A constant voltage source is connected to a center tap of the head while a first transistor of one circuit is connected to one side of the head and a first transistor of the other circuit in connected to the other side of the head. The first transistors of both circuits are normally back-biased. Means are provided responsive to an input signal to cause the first transistor of one of the circuits to become conducting, the polarity of the input signal controlling the choice of circuit. Means are also provided responsive to the input signal to close a transistor switch common to both symmetrical circuits thereby short circuiting the conducting transistor to ground causing it to saturate. Thus, during the transient period the saturated first transistor causes essentially all of the voltage presented by the voltage source to be presented to the recording head. After a transient period of predetermined length, capacitive charging causes the switch to open and presents a resistor, common to both symmetrical circuits, in the emitter circuit of the conducting first transistor. The transistor remains conducting but is no longer saturated. The conducting first transistor now presents a source of constant current causing a write current of predetermined value to be presented to the recording head so long as the input signal is present. An input signal of opposite polarity will cause the other symmetrical circuit to operate in a similar manner whereby a write current of opposite polarity is presented to the recording head.

BRIEF DESCRIPTION OF THE DRAWING

The manner of operation of the present invention and the manner in which it achieves the above and other advantages may be more clearly understood by reference to the following detailed description when considered with the drawing in which.

DETAILED DESCRIPTION

Figure 1:
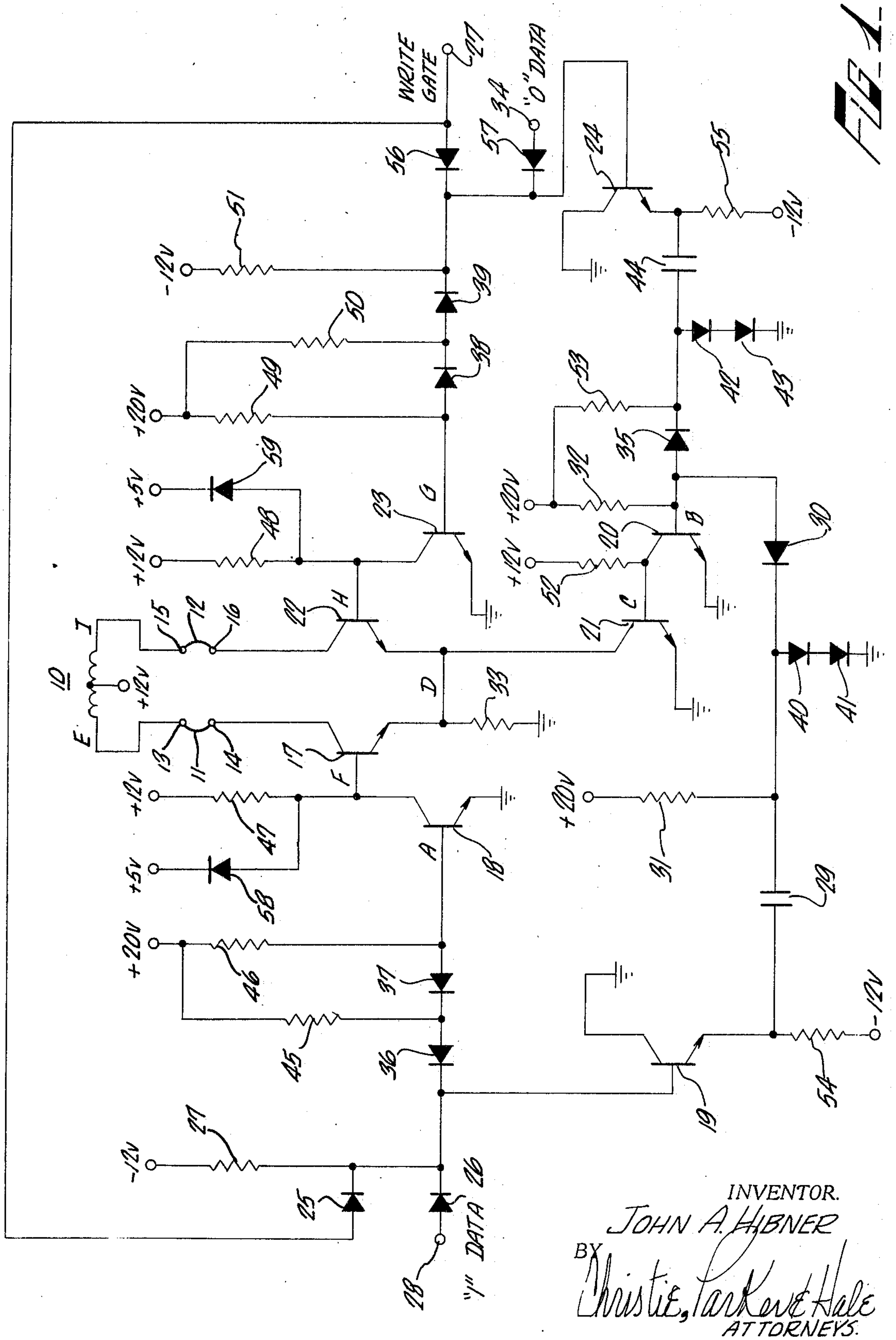
FIG. 1 depicts a preferred embodiment of a drive circuit according to the present invention.

FIG. 1 depicts a preferred embodiment of the drive circuit of this invention. Recording head 10 is shown having a center tap to which a potential of 12 volts is applied. Recording head 10 is connected to the drive circuit by connecting cables 11 and 12. Cable 11 connects terminals 13 and 14, while cable 12 connects terminals 15 and 16. Although cables 11 and 12 are shown as short lengths in FIG. 1 for purposes of illustrative convenience, they will, in actuality, be quite long in order that the recording head 10 be isolated from the drive circuit. These cables may be as much as ten feet in length and present a distributed capacitance of about thirty to forty picofarads per foot.

Selection circuitry, not shown, may be used to connect the write drive circuit to any one of a number of recording heads, such as head 10, and other selection circuitry, not shown, may be used to connect read circuitry to the recording head 10. The drive circuit shown in FIG. 1 presents two symmetrical circuits used in effecting a drive current of predetermined magnitude in recording head 10 within a predetermined period of time. One of these symmetrical circuits includes transistors 17, 18, 19, 20 and 21. The other symmetrical circuit includes transistors 20, 21, 22, 23 and 24. Thus, it is seen that the two transistors 20 and 21 are common to both of these symmetrical circuits.

The operation of the drive circuit will now be briefly discussed and attention is directed to the first mentioned symmetrical circuit. Diodes 25 and 26, and resistor 27, present a conventional AND gate for negative logic. The first symmetrical circuit is utilized to supply a drive current to recording head 10 only when a negative signal from a write gate, not shown, appears on terminal 27 and a negative signal representative of a "1" data signal appears on terminal 28. If such negative signals are not presented at terminals 27 and 28, transistor 18 will be in full saturation and will back-bias transistor 17. Likewise, transistor 20 will be in saturation and will back-bias transistor 21. When a "1" data signal is presented at terminal 28 during the write mode of operation, transistor 18 will be turned off and transistor 17 will be turned on. Similarly, the "1" data signal will be coupled via transistor 19 to capacitor 29 and diode 30 to turn off transistor 20, thereby turning on transistor 21. Transistor 21 will, at this time, be driven into full saturation and will effectively short-circuit the emitter of transistor 17 to ground. This short-circuiting of the emitter of transistor 17 will cause transistor 17 also to go into full saturation. Thus, at this time, the entire 12 volts presented at the center tap of recording head 10 will be fully applied across the two saturated transistors and the portion of recording head 10 associated with the first symmetrical circuit. The drive circuit thus, at this time, effectively presents a source of constant voltage across this portion of recording head 10.

The "1" data signal also causes capacitor 29 to commence charging through the parallel resistors 31 and 32, both of which are connected to a potential of 20 volts. After a predetermined period of time governed by the values selected for capacitor 29 and resistors 31 and 32, transistor 20 will again be forward-biased and will become saturated. At this time, transistor 21 will be back-biased and resistor 33 will be placed in the emitter circuit of transistor 17. At this time, transistor 17 will remain conducting, but will no longer be saturated. The emitter of transistor 17 will assume a particular value of potential, and the current through resistor 33 must be of the value required to maintain the emitter of transistor 17 at this value of potential. As a result, the collector current of transistor 17 will also be fixed. Consequently, after the initial transient period, the drive circuit effectively presents a source of constant current to the portion of recording head 10 associated with the first symmetrical circuit. The particular value of current presented to recording head 10 is governed by the value of resistance chosen for resistor 33. In a similar manner, the other symmetrical circuit will apply a source of constant voltage during a transient period to the portion of recording head 10 associated with it, and a source of constant current during a steady-state period following the transient period.

Whenever a data input signal is applied to terminals 28 or 34, transistors 20 and 21 will be included in the selected one of the symmetrical circuits by the effective OR gate presented by diodes 30 and 35. Diodes 36, 37, 38, 39, 40, 41, 42 and 43 provide noise immunity and diodes 40, 41, 42 and 43 are also present for the purpose of effecting the rapid recovery of capacitors 29 and 44.

The operation of circuit of FIG. 1 will next be described in conjunction with particular component values and particular input signals. This operation will be described in conjunction with timing diagram depicted in FIG. 2. Table I infra, sets forth representative values of components depicted in the circuit of FIG. 1. Resistances are in ohms, capacitances in picofarads and inductances in microhenrys. These circuit parameters are designed to achieve a current rise time of fifty nanoseconds, thereby enabling a bit-rate of approximately ten megacycles to be utilized. It is apparent to those skilled in the art that the following values may be modified without departing from the scope of applicant's teaching.

TABLE I

| | |
|---|---|
| L–10 | 7 |
| C–11 | 300 |
| C–12 | 300 |
| R–27 | 1.21K |
| R–45 | 51.1K |
| R–46 | 5.11K |
| R–47 | 220 |
| R–33 | 51 |
| R–48 | 220 |
| R–49 | 5.11K |
| R–50 | 51.1K |
| R–51 | 1.21K |
| R–52 | 220 |
| R–32 | 5.11K |
| R–53 | 5.11K |
| R–54 | 750 |
| R–31 | 5.11K |
| R–55 | 750 |
| C–29 | 75 |
| C–44 | 75 |

Figure 2:
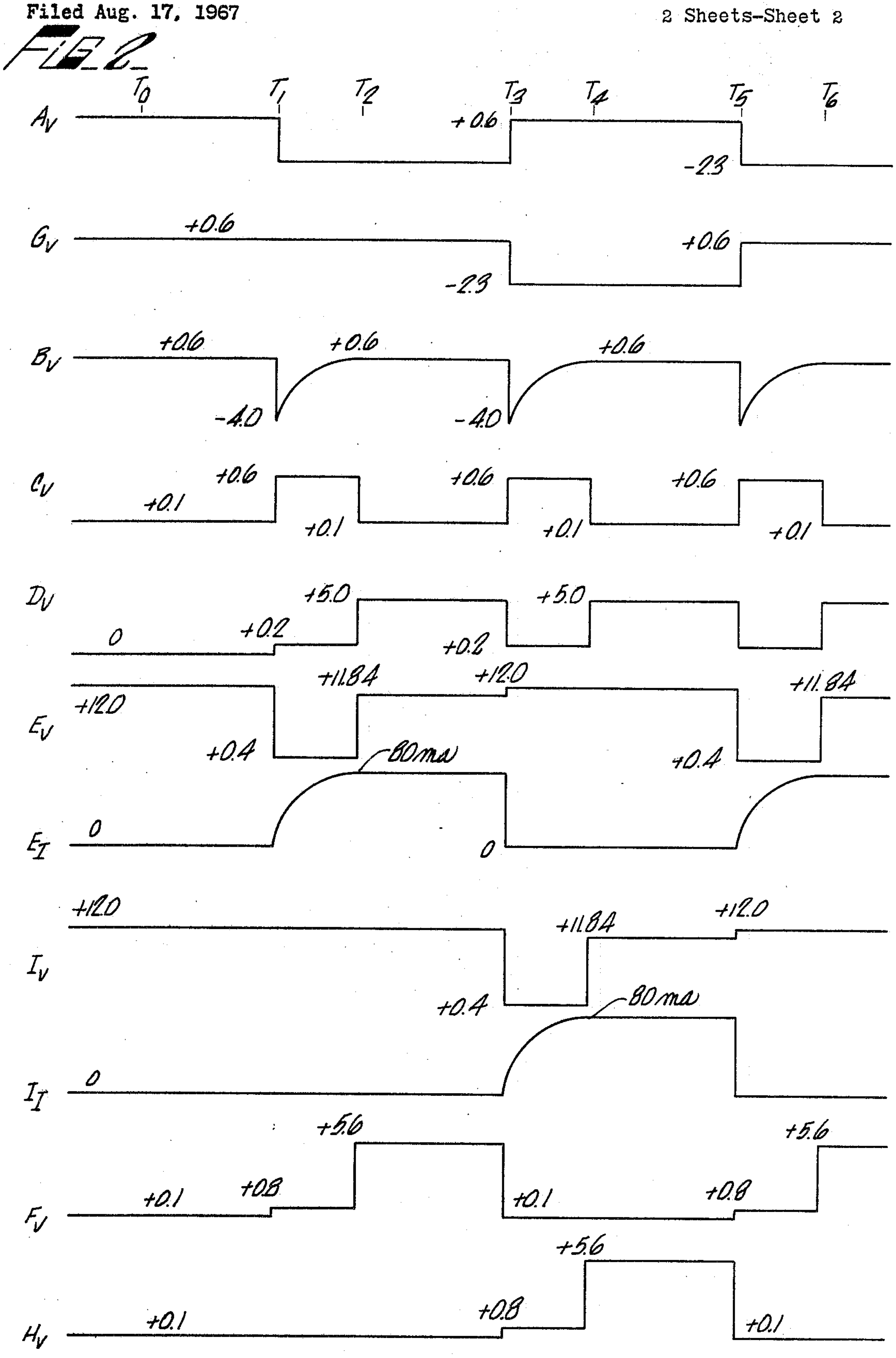
FIG. 2 depicts a timing diagram directed to particular locations within the circuit shown in FIG. 1 during operation of this circuit.

With respect to the operation of the circuit shown in FIG. 1 and the timing diagrams shown in FIG. 2, it will be assumed that logic data input signals of a value of —4 volts are applied to terminals 28 and 34, and that a signal of —4 volts is also applied to terminal 27 during the write mode of operation. These terminals will be assumed to be at ground potential when no such input signal is applied. Steady-state voltages are applied to other terminals as shown in FIG. 1. The input terminals 28 and 34 receive inputs from "1" and "0" outputs respectively of a write flip-flop not shown herein.

The timing diagram shown in FIG. 2 depicts voltage and current values appearing at particular locations within the circuit of FIG. 1 during the operation of this circuit. Thus, point A is the junction of diode 37 and the base of transistor 18; point B is the base of transistor 20; point C is the base of transistor 21; point D is the emitter of transistors 17 and 22; point E is the end of recording head 10 connected to terminal 13; point F is the base of transistor 17; point G is the base of transistor 23; point H is the base of transistor 22; and point I is the end of recording head 10 connected to terminal 15.

With a bit-rate of ten megacycles and a consequent digit cell time of one hundred nanoseconds, a write current must reach its peak value within fifty nanoseconds, in order to reach this value within one-half of a digit cell time. If it is assumed that peak current of eighty milliamps is required in order to saturate a magnetic recording medium associated with recording head 10, then it may be shown that a voltage of approximately eleven volts should be applied across the recording head in order to achieve a current of eighty milliamps through the recording head within a period of fifty nanoseconds. The circuit of FIG. 1, having the values of components heretofore specified, is capable of achieving this goal.

After the fifty nanosecond transient period has terminated, a source of constant current provides a current of a steady value of approximately eighty milliamps to the recording head. In order that the full eighty milliamps provided by the current source reaches the head, it is necessary that the distributed capacitance presented by the connecting cables 11 and 12, be substantially fully charged during the transient period.

At Time $T_0$ as shown in the timing diagram of FIG. 2, it will be assumed that neither the AND gate made up of diodes 25 and 26 and resistor 27, nor the AND gate made up of diodes 56 and 57 and resistor 51, passes an input signal to either of the symmetrical circuits comprising the drive circuit of FIG. 1. At this time, both transistors 18 and 23 will be in full saturation and will back-bias transistors 17 and 22. Point A and point G both will be at potentials of approximately +0.6 volt, if diodes 25, 26, 56, and 57 are germanium diodes, diodes 36 and 39 are stabistor diodes, and diodes 37 and 38 are silicon diodes. Point B will be at a potential of about +0.6 volt which is the base-to-emitter potential drop across saturated transistor 20. Point C will be at a potential of approximately +0.1 volt which is the emitter-to-collector potential drop across saturated transistor 20. Point D will be at ground potential. Point E and I will both be at a potential of +12 volts supplied by the source connected to the central tap of recording head 10. Point F will be at a potential of approximately 0.1 volt, which is the potential drop across the emitter and collector of saturated transistor 18; and Point H will similarly be at a potential of approximately 0.1 volt, which is the potential drop across the emitter-to-collector of saturated transistor 23. Transistors 17, 22 and 21 may be medium power, high speed, silicon transistors. Transistors 18, 23, 20, 19 and 24, may be silicon transistors of the milliwatt class. Although all of the transistors are shown as being of the NPN variety, it is apparent that the present invention also could be constructed in a manner to utilize transistors of the PNP variety.

At time $T_1$, it will be assumed that an input data signal of −4 volts is applied to terminal 28. At this time, point A will assume a potential of approximately −2.3 volts and transistor 18 will be cut off. As a result of transistor 18 being cut off, transistor 17 will be forward-biased. Transistor 23 will remain saturated and point G will remain at a potential of 0.6 volt. The input data signal will be reflected across capacitor 29 and diode 30, and point B will assume a potential of approximately −4 volts, back-biasing transistor 20. Transistor 20 will be cut off and transistor 21 will be driven to full saturation, thereby causing point C to assume a potential of approximately 0.6 volt. With transistor 21 saturated, point D will assume a potential of approximately 0.2 volt and resistor 33 will be short-circuited causing transistor 17 to become saturated. With both transistors 21 and 17 saturated, point E will assume a potential of approximately 0.4 volt, thereby placing approximately 11.6 volts across the portion of recording head 10 associated with the symmetrical circuit to which the input signal was applied. Point I will remain at approximately +12 volts. Point F will assume a potential of approximately 0.8 volt, this being the collector-to-emitter drop across saturated transistor 21, plus the base-to-emitter drop across saturated transistor 17. Point H will remain at a potential of approximately 0.1 volt.

It will be assumed that time $T_2$ follows $T_1$ by fifty nanoseconds, this being the duration of the transient period. At this time, point A remains at a potential of approximately −2.3 volts, and point G remains at a potential of approximately 0.6 volt. Point B, at this time, resumes a potential of approximately +0.6 volt, this potential being sufficient to again forward-bias transistor 20. The values of capacitor 29 and resistors 31 and 32 are chosen such that the potential of point B again reaches the value necessary to forward-bias and turn on transistor 20 after a predetermined period of fifty nanoseconds has elapsed since time $T_1$. At time $T_2$, point C will again be at a potential of approximately 0.1 volt since transistor 20 will again be saturated and this value of potential at point C will cut off transistor 21. Transistor 17 will remain conducting, but resistor 33 will now appear in its emitter circuit and it will no longer be saturated. The presence of resistor 33 in the emitter circuit of transistor 17 now causes this transistor to become a current source with the value of current in both its emitter and collector circuits, and consequently in head 10, governed by the value of resistor 33. Point D will, at this time, assume a potential of approximately +5.0 volts and point F will assume a potential of approximately +5.6 volts. Point F will be at 5.6 volts because of the clamping effect of diode 58, while point D will be at +5.0 volts because of the drop between the base and emitter of transistor 17. Point E will, at this time, be at a potential of somewhat less than 12 volts; it will be less than 12 volts by the amount of the potential drop across the portion of recording head 10 associated with the symmetrical circuit shown on the left in FIG. 1. If eighty milliamps are flowing in this portion of the recording head and this portion of the head has a resistance of two ohms, then point E will assume a potential of approximately 11.84 volts. The current through this portion of recording head 10 at this time will have achieved the desired value of approximately eighty milliamps. Point I, at this time, will remain at the value of approximately +12 volts. Point H will remain at a potential of approximately 0.1 volt.

At time $T_3$, it will be assumed that an input signal of approximately −4 volts is presented to the "0" data input terminal 34. At this time, transistor 18 will again become fully saturated, and point A will revert to a potential of approximately 0.6 volt. Point G will assume a potential of approximately −2.3 volts just as did point A at time $T_1$. Point B will again assume a potential of −4 volts by reason of the input signal being reflected across capacitor 44 and diode 35. This signal will again cut off transistor 20, and cause transistor 21 to again become fully saturated. As a result, point C will again assume a potential of approximately 0.6 volt; and point D will again assume a potential of approximately 0.2 volt. Point E will again assume a potential of approximately 12 volts; while point I will assume a potential of approximately 0.4 volt just as did point E at time $T_1$. At time $T_3$, the input signal back-biases transistor 23 allowing transistor 22 to become conducting. The saturated transistor 21 short-circuits the emiter of transistor 22 to ground and causes transistor 22 to become fully saturated. Since transistors 21 and 22 are, at this time, both fully saturated, point I is at the aforesaid value of 0.4 volt. Point F, at this time, reverts to the potential of approximately 0.1 volt since transistor 18 will again be saturated upon the removal of the input signal from terminal 28. Point H will assume a potential of approximately +.8 volts, this being the sum of the collector-to-emitter drop across saturated transistor 21 and the base-to-emitter drop across saturated transistor 22. Thus, at time $T_3$, a potential of approximately 11.6 volts is applied directly across the portion of recording head 10 associated with the symmetrical circuit which includes terminal 34. Between time $T_3$ and time $T_4$, this potential applied to recording head 10 will effect a write current of approximately eighty milliamps in this portion of recording head 10.

At time $T_4$, which follows time $T_3$ by the predetermined period of fifty nanoseconds, the transient during which the write current reaches its full value of eighty milliamps, will come to an end. At this time, point A remains at a potential of approximately 0.6 volt and point G remains at a potential of approximately −2.3 volts. Point B, however, will, this time, have reached a value of approximately +0.6 volt which again is enough to forward-bias transistor 20 and it again becomes fully saturated. The predetermined time of fifty nanoseconds within which point B reaches a valve sufficient to again turn on transistor 20, is governed by values chosen for capacitor 44 and resistors 52 and 53. With transistor 20 again fully saturated, point C again resumes a potential of approximately 0.1 volt, and resistor 33 is inserted in the collector circuit of transistor 22. Transistor 22 remains conducting, but is no longer saturated at this time. Consequently, point D assumes a potential of approximately +5 volts and point H assumes a potential of approximately +5.6 volts by reason of the clamping effect of diode 59 connected to a potential of 5 volts. Point E, at this time, remains at a potential of +12 volts while point I assumes a potential of approximately 11.84 volts assuming a current of eighty milliamps and a resistance of two ohms presented by the portion of recording head 10 associated with the present active one of the symmetrical circuits. The current in this portion of recording head 10 will have achieved the predetermined selected value of approximately eighty milliamps as of time $T_4$. Point F will remain at a potential of approximately 0.1 volt since transistor 18 remains saturated.

As of time $T_4$, the transient period associated with the symmetrical circuit including terminal 34, has concluded and a steady-state period commences during which a source of constant current maintains a current through recording head 10 of approximately eighty milliamps. This is achieved by reason of the resistor 33 now being connected in the emitter circuit of transistor 22. A constant current through resistor 33 is required in order to to maintain point D at its required value of potential, and transistor 22 thus effectively becomes a source of constant current during the steady-state period.

At time $T_5$, shown in FIG. 2, it is assumed that another input signal appears at terminal 28. At this time, the entire circuit shown in FIG. 2 will operate in a manner identical with that previously described with respect to time $T_1$.

At time $T_6$, also shown in FIG. 2 and which occurs fifty nanoseconds after time $T_5$, the entire circuit will operate in a manner identical to that previously described with respect to time $T_2$.

The values of resistors 47 and 48 are chosen in order to guarantee full saturation of transistors 17 and 22 during the transient periods of their respective symmetrical circuits. This value is determined by the total current needed to supply to the load during the transient period, and is the sum of the current needed by the recording head and that needed by the connecting cable in order to fully charge the distributed capacitance of the connecting cable during the transient period. Transistors 19 and 24 are always in conduction but do not become saturated. They are utilized to achieve rapid restoration of capacitors 29 and 44 between transient periods. Diodes 40 and 41 back-bias diode 30 between transient periods, and diodes 42 and 43 back-bias diode 35 between transient periods. Resistors 45 and 46 and diode 36 are utilized to back-bias diode 37 during the time when no input signal is applied to terminal 28 in order to provide noise immunity. Similarly, resistors 49 and 50 and diode 39 are utilized to back-bias diode 38 in order to provide noise immunity during the time when no input signal is applied to terminal 34.

What has been described is considered to be only an illustrative embodiment of the present invention, and accordingly it is to be understood that various and numerous other arrangements may be devised by one skilled in the art without departing from the spirit and scope of this invention.

What is claimed is:

1. A drive circuit for presenting a current to an inductive load comprising:

a first transistor;

the inductive load being serially connected between the collector electrode of the first transistor and a first reference potential;

a first resistor serially connected between the emitter electrode of the first transistor and a second reference potential;

means responsive to an input signal for forward-biasing the base electrode of the first transistor;

switching means also responsive to the input signal for short-circuiting the emitter electrode of the transistor to the second reference potential thereby causing the first transistor to become saturated; and timing means also responsive to the input signal for opening the short-circuit a predetermined period after reception of the input signal thereby removing the first transistor from the saturated state.

2. A drive circuit according to claim 1 further comprising a connecting cable containing distributed capacitance serially connected between the inductive load and the collector electrode of the first transistor.

3. A drive circuit according to claim 2 in which the switching means comprises a second transistor connected between the emitter electrode of the first transistor and the second reference potential and means responsive to the input signal for driving the second transistor into saturation.

4. A drive circuit according to claim 3 in which the timing means comprises a third transistor, the third transistor being normally saturated and normally cutting off the second transistor and means responsive to the input signal for cutting off the third transistor and for holding the third transistor in a nonconducting condition for a predetermined period of time.

5. A drive circuit according to claim 4 in which the means for cutting off the third transistor comprises:

a timing capacitor;

at least one timing resistor;

means responsive to the input signal for transferring a signal across the timing capacitor to cut off the third transistor; and means including the timing capacitor for restoring the potential presented to the third transistor to a value sufficient to again forward-bias this transistor after a predetermined period of time.

6. A drive circuit according to claim 5 in which the timing capacitor and timing resistor have values such that the third transistor is forward-biased after a predetermined period of not more than fifty nanoseconds.

7. A drive circuit according to claim 6 in which the means for transferring a signal across the timing capacitor comprises:

a fourth transistor coupled between an input terminal on which the input signal appears and the timing capacitor; and means for maintaining the fourth transistor in a conducting state.

8. A drive circuit according to claim 7 in which the means for forward-biasing the first transistor comprises a normally saturated fifth transistor which back-biases the first transistor; means responsive to the input signal for cutting off the fifth transistor and means responsive to the fifth transistor being cut off for forward-biasing the first transistor.

9. A drive circuit for presenting a write current to a recording head comprising:

a first normally nonconducting transistor;

the recording head being serially connected between the collector electrode of the first transistor and a first reference potential;

a first resistor serially connected between the emitter electrode of the first transistor and a second reference potential;

a connecting cable containing distributed capacitance serially connected between the recording head and the collector electrode of the first transistor;

a second normally nonconducting transistor connected between the emitter electrode of the first transistor and the second reference potential;

a third normally saturated transistor normally holding the second transistor in its nonconducting state;

means responsive to an input signal for cutting off the third transistor and for forward-biasing the first transistor;

means for driving the first and second transistors into saturation responsive to the third transistor being cut off; and timing means including a timing capacitor coupled to the third transistor and a timing resistor for again forward-biasing the third transistor after a predetermined period of time.

10. A drive circuit for presenting a write current of either of two polarities to a recording head comprising:

first and second symmetrical circuits coupled to the head;

both symmetrical circuits sharing a current limiting resistor and a switch for selectively short circuiting the resistor;

means responsive to a first input signal applied to an input terminal of the first circuit for closing the switch and presenting a voltage source to the head which effects a write current of a first polarity in the head;

means responsive to the first input signal for opening the switch after a predetermined period of time and presenting a current source to the head which maintains a first polarity write current of predetermined magnitude in the head;

means responsive to a second input signal applied to an input terminal of the second circuit for closing the swtich and presenting a voltage source to the head which effects a write current of a second polarity in the head; and means responsive to the second input signal for opening the switch after a predetermined period of time and presenting a current source to the head which maintains a second polarity write current of predetermined magnitude in the head.

11. A drive circuit for presenting a current of either of two polarities to an inductive load comprising:

first and second symmetrical circuits coupled to the load;

the first symmetrical circuit comprising:

a first transistor;

a first portion of the inductive load being serially connected between the collector electrode of the first transistor and a first reference potential;

a first resistor serially connected between the emitter electrode of the first transistor and a second reference potential;

means responsive to an input signal applied to an input terminal of the first symmetrical circuit for forward-biasing the base electrode of the first transistor;

switching means responsive to the input signal applied to the first circuit for short circuiting the emitter electrode of the first transistor to the second reference potential thereby causing the first transistor to become saturated; and first timing means responsive to the input signal applied to the first circuit for opening the short circuit after a first predetermined period of time thereby removing the first transistor from the saturated state; and the second symmetrical circuit comprising:

a second transistor;

a second portion of the inductive load being serially connected between the collector electrode of the second transistor and the first reference potential;

the first resistor also serially connected between the emitter electrode of the second transistor and the second reference potential;

means responsive to an input signal applied to an input terminal of the second symmetrical circuit for forward-biasing the base electrode of the second transistor;

the twitching means also being responsive to the input signal applied to the second circuit for short circuting the emitter electrode of the second transistor to the second reference potential thereby causing the second transistor to become saturated; and second timing means responsive to the input signal applied to the second circuit for opening the short circuit after a second predetermined period of time thereby removing the second transistor from the saturated state.

12. A drive circuit according to claim 11 in which the first and second portions of the inductive load are both connected to a single terminal maintained at the first reference potential.

13. A drive circuit according to claim 11 further comprising a first connecting cable containing distributed capacitance serially connected between the inductive load and the collector electrode of the first transistor and a second connecting cable containing distributed capacitance serially connected between the inductive load and the collector electrode of the second transistor.

14. A drive circuit according to claim 13 in which the switching means comprises:

a third normally saturated transistor;

a fourth transistor connected between the emitter of electrodes of both the first and second transistors and the second reference potential, the fourth transistor normally held in a cut off condition by the saturated condition of the third transistor;

means responsive to an input signal applied to the first or to the second circuit for cutting off the third transistor; and means responsive to the third transistor being cut off for driving the fourth transistor into saturation.

15. A drive circuit according to claim 14 in which the first timing means comprises means responsive to an input signal applied to the first circuit for again forward-biasing the third transistor after a first predetermined period of time and the second timing means comprises means responsive to an input signal applied to the second circuit for again forward-biasing the third transistor after a second predetermined period of time.

16. A drive circuit according to claim 15 in which the first timing means comprises a first timing capacitor and a first timing resistor and the second timing means comprises a second timing capacitor and a second timing resistor.

17. A drive circuit according to claim 16 in which the means for forward-biasing the first transistor comprises a normally saturated fifth transistor which back-biases the first transistor, means responsive to an input signal applied to the first circuit for cutting off the fifth transistor, and means responsive to the fifth transistor being cut off for forward-biasing the first transistor; and in which the means for forward-biasing the second transistor comprises a normal saturated sixth transistor which back-biases the second transistor, means responsive to an input signal applied to the second circuit for cutting off the sixth transistor, and means responsive to the sixth transistor being cut off for forward-biasing the second transistor.

18. A drive circuit for presenting a write current of either of two polarities to a recording head comprising:
- first and second normally nonconducting transistors;
- a first portion of the recording head being serially connected between the collector electrode of the first transistor and a first reference potential;
- a second portion of the recording head being serially connected between the collector electrode of the second transistor and the first reference potential;
- a first resistor serially connected between the emitter electrodes of both the first and second transistors and a second reference potential;
- first and second connecting cables each containing distributed capacitance being serially connected between the collector electrodes of the first and second transistors, respectively, and the first and second portions, respectively, of the recording head;
- a third normally nonconducting transistor connected between the emitter electrodes of both the first and second transistors and the second reference potential;
- a fourth normally saturated transistor normally holding the third transistor in its nonconducting state;
- means responsive to an input signal applied to a first input terminal for cutting off the fourth transistor and for forward-biasing the first transistor;
- means responsive to an input signal applied to a second input terminal for cutting off the fourth transistor and for forward-biasing the second transistor;
- means responsive to the fourth transistor being cut off for driving into saturation the third transistor and that one of the first and second transistors which is forward-biased; and
- timing means including a timing capacitor coupled to the fourth transistor for again forward-biasing the fourth transistor after a predetermined period of time.

References Cited

UNITED STATES PATENTS

| | | | |
|---|---|---|---|
| 2,848,653 | 8/1958 | Hussey | 346—74 XR |
| 2,900,215 | 8/1959 | Schoen | 346—74 |
| 3,438,054 | 4/1969 | Wisner | 340—174.1 XR |

BERNARD KONICK, Primary Examiner

G. M. HOFFMAN, Assistant Examiner

U.S. Cl. X.R.

340—174.1; 307—270